E. WISMAR.
LAWN SPRINKLER.
APPLICATION FILED MAR. 19, 1912.
1,074,336.
Patented Sept. 30, 1913.
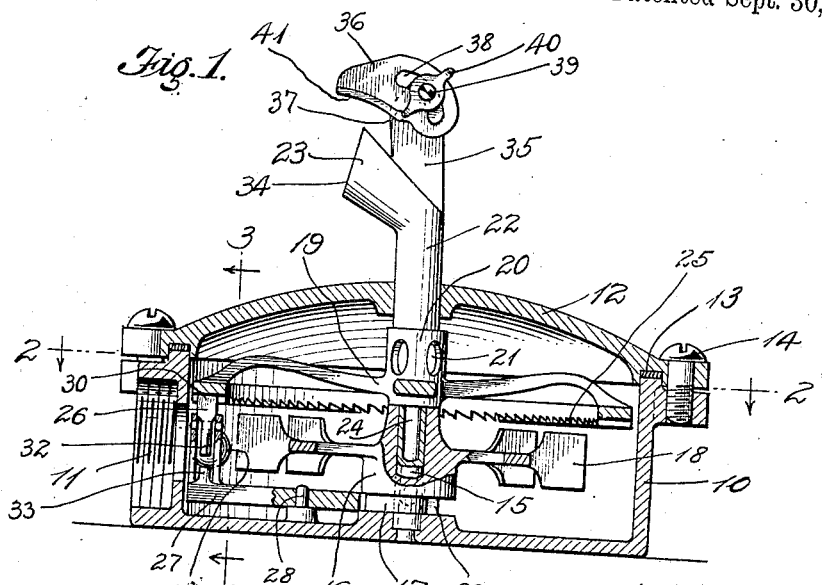
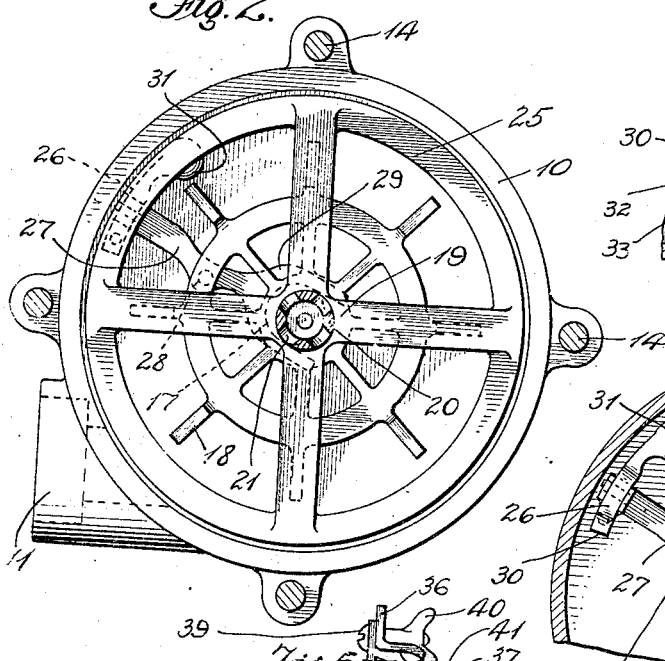
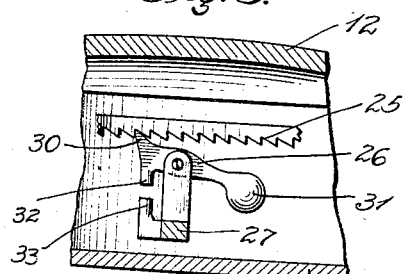
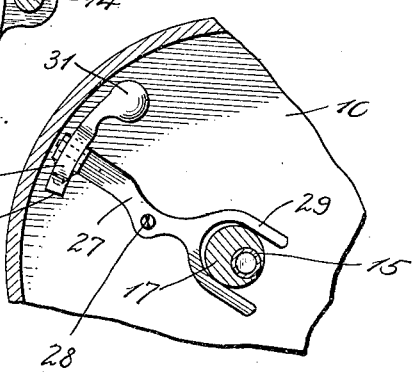
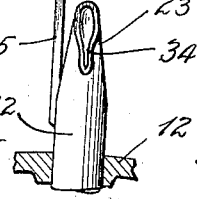
Witnesses:
Inventor.
Emil Wismar.
by Hazard & Strauss
Attys.

UNITED STATES PATENT OFFICE.

EMIL WISMAR, OF LOS ANGELES, CALIFORNIA.

LAWN-SPRINKLER.

1,074,336.

Specification of Letters Patent.  Patented Sept. 30, 1913.

Application filed March 19, 1912. Serial No. 684,765.

*To all whom it may concern:*

Be it known that I, EMIL WISMAR, a citizen of the United States, residing at Los Angeles, in the county of Los Angeles and State of California, have invented new and useful Improvements in Lawn-Sprinklers, of which the following is a specification.

This invention relates to improvements in sprinkling devices and particularly to lawn sprinklers which are adapted to distribute and properly spread the stream of water over a considerable area.

It is an object of the invention to provide a sprinkling mechanism in which the force of the water will be utilized, in directing the distribution of the spray in different directions.

It is also an object of the invention to provide a lawn sprinkler in which a rotating nozzle is mounted, means being provided and operated by the force of the water passing through the sprinkler for positively feeding the nozzle in its movement.

In the accompanying drawing forming a part of this specification, Figure 1 is a vertical sectional view through the lawn sprinkler, the nozzle and portions of the operating mechanism being shown in elevation. Fig 2 is a horizontal sectional view taken upon the line 2—2 of Fig. 1. Fig. 3 is a fragmentary detail sectional view taken upon the line 3—3 of Fig. 1. Fig. 4 is a fragmentary sectional view through a portion of the device, the means for actuating the nozzle turning means being shown in plan. Fig. 5 is a front elevation of the nozzle member of the device.

The details and features of the invention will now be more particularly described, reference being had to the said drawing in which—

10 indicates a casing preferably cylindrical in shape and having an inlet opening 11 in its side wall, preferably arranged to direct incoming water in a tangential direction with respect to the said casing. The casing 10 is provided with a cover 12 adapted to close the top thereof, a gasket or washer 13 being interposed between the parts so as to prevent leakage. The cover is removably secured in position by screws 14 located at suitable points about the periphery of the casing.

Mounted centrally of the casing 10 and projecting upwardly from the bottom thereof is a hollow shaft 15, which extends about two-thirds of the height of the main casing and has journaled upon it a water wheel 16. The hub of said wheel has a bearing upon the exterior of the said shaft 15 and the lower end of the hub is reduced and formed with an eccentric or cam 17. The wheel is provided at its periphery with a number of vertically arranged paddles 18 which are mounted a sufficient distance from the axis of the wheel, to come opposite to the inlet opening 11 of the casing and receive the impact of the water as it enters the said casing. The wheel will thus be in position to be continually driven by the water passing through the sprinkler.

Mounted above the hollow shaft 15 and the hub of the water wheel 16, is an actuating member in the form of a ratchet wheel 19, having a hollow hub portion 20, provided with water inlet openings 21 in its peripheral wall. The said hollow hub carries a tube 22 upon its upper end which projects through a central bearing formed in the cover 12. The upper end of said tube is provided with a laterally bent nozzle 23 through which the water escapes from the device.

Projecting downwardly from the hub 20 is a journal pin 24 which loosely fits in the hollow shaft 15, thus finding a bearing therein. The wheel thus has a bearing in the said shaft 15 at the bottom and in the casing 12 at the top so that it will rotate freely within the casing 10.

The peripheral portion of the wheel 19 is provided with ratchet teeth 25 which project downwardly therefrom. The said teeth are adapted to be engaged by a pivoted dog 26, mounted in a standard formed upon the outer end of a lever 27, which is journaled upon a stud 28 rising from the bottom of the casing 10. The said stud is located approximately half way between the central shaft 15 and the said dog 26, and the lever 27 is provided at its inner end with wide fork 29 adapted to receive the eccentric 27 within it. The dog 26 is pivoted about centrally of its length, one end being tapered at 30 to engage the teeth 25 while the other end is formed with a weight 31. The tapered end or nose 30 of the dog, is prevented from being depressed to too great an extent by the teeth 25 of the ratchet wheel by means of a stop 32, formed on the dog and adapted to engage a coöperating stop 33, projecting upwardly from the lever 27 as clearly shown in Fig. 3.

It will be observed that as the water enters the casing 10 and impinges upon the paddles 18, it will rotate the water wheel 16, thus operating the eccentric 17. By this means the lever 27 will be continuously oscillated so as to cause the dog to be moved back and forth beneath the rack upon the ratchet wheel 19, and so as to continually turn the said wheel. The water will thus pass through the casing and into the apertures 21 of the hollow hub 20 and thence through the pipe 22 and be discharged from the nozzle 23. The constant turning of the wheel 19 will swing the nozzle about its pivotal point for directing the sprayed water in all directions. The said nozzle 23 may be made with its outlet opening smaller at bottom as at 34 than at the top whereby the greatest amount of water passing from the nozzle, will be discharged at the upper end of the outlet opening where it is to travel to the greatest distance and becomes more broken up before reaching the ground than the water which escapes at the lower end of the said opening. The nozzle is also preferably provided with an upwardly extending standard 35, said standard preferably being in the form of a flat plate having pivoted to one side thereof at its upper end a spreader 26 for further directing the sprinkling of the water. Said spreader is provided with a pivot 37 engaging an aperture in the standard 35 so that it may rock thereon. The said spreader is also formed with a segmental slot 38, the said slot being adapted to engage a screw 39 projecting from the said standard 35. A clamping nut 40 is mounted upon said screw 39 for clamping the said spreader 36 in its adjusted positions upon its pivot point. The said spreader 36 is formed with a horizontally extending curved flange 41, adapted to overhang the upper end of the nozzle 30 so as to strike the upper portion of the stream of water escaping from said nozzle and tend to spread it laterally over a greater area than if the water issued from said nozzle without further guidance.

The operation of the device will be readily understood from the above description.

What I claim is:

1. A sprinkler, comprising a hollow casing, a water wheel concentrically mounted therein, a rotatable nozzle projecting concentrically from said casing and having an actuating member mounted on its shaft within the casing, and ratchet means operated by the water wheel for rotating the said nozzle actuating member.

2. A sprinkler, comprising a hollow casing, a water wheel pivotally mounted therein, a casing having a tangentially arranged inlet opening whereby the water will be given a whirling movement for turning said wheel, a nozzle member also pivoted in said casing, a ratchet wheel connected with said nozzle, a lever pivoted in said casing adjacent said ratchet wheel, a weight operated pawl mounted on said lever adapted to actuate said ratchet, a stop on the lever to limit the movement of said pawl, and an eccentric carried by said water wheel and adapted to engage and oscillate said lever.

In witness that I claim the foregoing I have hereunto subscribed my name this 11th day of March, 1912.

EMIL WISMAR.

Witnesses:
EDMUND A. STRAUSE,
E. STADTMAN.